(12) United States Patent
Oishi et al.

(10) Patent No.: US 6,237,585 B1
(45) Date of Patent: May 29, 2001

(54) WIRE-SAWING MACHINE

(75) Inventors: Hiroshi Oishi; Keiichiro Asakawa; Junichi Matsuzaki, all of Annaka (JP)

(73) Assignees: Super Silicon Crystal Research Institute Corp., Gunma-ken; Tokyo Seimitbu Co., Ltd., Tokyo, both of (JP)

( * ) Notice: Subject to any disclaimer, the term of this patent is extended or adjusted under 35 U.S.C. 154(b) by 0 days.

(21) Appl. No.: 09/488,906

(22) Filed: Jan. 21, 2000

(51) Int. Cl.[7] .................................................. B28D 1/06
(52) U.S. Cl. ............................ 125/16.02; 125/21; 451/5
(58) Field of Search ........................... 125/16.01, 16.02, 125/21; 451/5, 168

(56) References Cited

U.S. PATENT DOCUMENTS

| | | | | |
|---|---|---|---|---|
| 3,831,576 | * | 8/1974 | Mech .................................. | 125/21 X |
| 5,564,409 | * | 10/1996 | Bonzo et al. .................. | 125/16.02 X |
| 5,715,807 | * | 2/1998 | Toyama et al. ................... | 125/16.02 |
| 5,829,424 | * | 11/1998 | Hauser ............................... | 125/16.01 |
| 5,907,988 | * | 1/1999 | Kiuchi et al. .................. | 125/16.01 X |

FOREIGN PATENT DOCUMENTS

| | | |
|---|---|---|
| 63-062655 | 3/1988 | (JP) . |
| 63-260757 | 10/1988 | (JP) . |
| 01177958 | 7/1989 | (JP) . |
| 09094755 | 4/1997 | (JP) . |
| 10119031 | 5/1998 | (JP) . |
| 10193340 | 7/1998 | (JP) . |

* cited by examiner

*Primary Examiner*—Joseph J. Hail, III
*Assistant Examiner*—Anthony Ojini
(74) *Attorney, Agent, or Firm*—Webb Ziesenheim Logsdon Orkin & Hanson, P.C.

(57) ABSTRACT

An ingot 9 is sliced to wafers by a wire 5 which travels around grooved rollers 1 to 3. A tension applied to the wire 5 is detected by tension sensors 21, while vertical displacement of dancer rollers 19 is detected by position sensors 20. At least one of a fluctuation gap of the tension, a fluctuating velocity of the tension, an acceleration of the fluctuation, vertical movement of the dancer rollers 19, a velocity of the vertical movement and acceleration of the vertical movement is calculated from the detection results, and compared with a threshold in a calculating circuit 23 to judge a sign predicting abnormal increase of the tension. When the predicting signal appears, a command signal is outputted from the calculating circuit 22 to a controller 23 to stop operation of a wire-sawing machine or to relax the wire 5. Since rupture of the wire 5 is prevented in bud, a wire-sawing machine is efficiently driven for slicing the ingot 9 with a high productivity.

4 Claims, 2 Drawing Sheets

WIRE-SAWING MACHINE

BACKGROUND OF THE INVENTION

1. Field of the Invention

The present invention relates to a wire-sawing machine which can previously inhibit rupture of a wire used for slicing an ingot.

2. Brief Description of the Prior Art

After top and tail parts are cut off an ingot produced by a pulling method or the like, the ingot is ground at its periphery, subjected to orientation flat processing and then sliced to wafers of predetermined thickness. Although an inner blade slicer has been used so far for such ingot-slicing, it can not well cope with enlarged of wafers. Therefore, a wire saw using a piano wire has been widely adopted in response to an intensified demand for wafers enlarged in size.

A conventional wire-sawing machine has three grooved rollers 1–3, one of which (the roller 3) is coupled to a drive motor 4, as shown in FIG. 1. A wire 5 is pulled out from a reel 6, passed around the grooved rollers 1 to 3 multiple times and then wound on another reel 7. A tensioner 8 applies a tension to the wire 5. Thus, the wire travels in a stretched state along a travel path around the grooved rollers 1 to 3.

An ingot 9 to be sliced is fixed to a holder 10 using a proper adhesion jig and located at a position between the grooved rollers 1 and 2. The ingot 9 is sliced to a plurality of wafers by cutting motion of the wire 5. During slicing, slurry 11 is supplied from a slurry tank 12 through a supply tube 13 to a nozzle 14, sprayed onto the wire 5, collected in a pan 15 and then returned to the slurry tank 12, in order to promote the cutting motion. The slurry 11 is cooled by circulation between the slurry tank 12 and a heat exchanger 16.

The wire 5 is sent out form the reel 6 through deflector rollers 18 to the grooved rollers 1 to 3, used for slicing the ingot 9 during one way passing along a direction $d_1$, forwarded through other deflector rollers 18 to another reel 7, and then wound on the reel 7, as shown in FIG. 2. The wire 5 may be bi-directionally forwarded, instead. That is, a travel of the wire 5 along a direction $d_2$ together with the travel along the direction $d_1$ is periodically repeated in the manner such that the wire 5 is successively wound on the reel 7 as a whole.

A tension is applied to the wire 5 in order to slice the ingot 9 under stable conditions. Such a tension is applied by the pendulum-type tensioner 8 (shown in FIG. 1), a balance weight 17 (shown in FIG. 2) or a powder clutch (not shown). For instance, the wire 5 is sent along a travel path around a dancer roller 19 provided between the inlet-side deflector roller 18 and the outlet-side deflector roller 18. The dancer roller 19 supports a balance weight 17 for application of a predetermined tension.

The tension applied to the wire occasionally increases during travelling of the wire 5. Especially, increase of tension likely occurs when a travelling direction of the wire 5 is switched as $d_1 \rightarrow d_2$ or $d_2 \rightarrow d_1$. An increasing part of the tension is somewhat absorbed by upward turning of the tensioner (FIG. 1), upward motion of the dancer roller 19 (FIG. 2) or rotation of a powder clutch (not shown). However, abrupt increase of the tension is not compensated for with such motion of the tensioner 8, the dancer roller 19 or the powder clutches.

Such abrupt increase of the tension, i.e. abnormal tension, causes rupture of the wire 5 regardless of such tension-controlling means as the tensioner 8, the dancer roller 19 or the powder clutch. When the wire 5 is broken, wire-sawing operation is inevitably interrupted. In addition, a lot of works and time are required for detaching the broken wire 5 and stretching a new wire 5, resulting in reduction of productivity.

SUMMARY OF THE INVENTION

The present invention aims at operation of a wire-sawing machine under stable conditions by judging a sign predicting abnormal increase of a tension applied to a wire and performing proper action such as operation-stop or tension relaxation in order to previously prevent rupture of the wire.

The newly proposed wire-sawing machine includes:

- a plurality of grooved rollers having a plurality of grooves for travel paths of an ingot-slicing wire on peripheries thereof,
- a wire reel for sending a new wire through deflector rollers to the grooved rollers,
- another wire reel for winding a wire sent out from the grooved rollers through other deflector rollers,
- a tensioner for applying a predetermined tension to the travelling wire,
- a tension sensor for detecting a tension applied to the wire, provided at a position between the grooved rollers and the deflector rollers,
- calculating and judging circuits to which a detected value of the tension applied to the wire is inputted for judging a sign predicting abnormal increase of the tension from a fluctuating gap of the tension, a fluctuation velocity of the tension and/or an acceleration of the tension, and
- a controller to which a signal predicting abnormal increase of the tension is inputted from the calculating and judging circuits for outputting an operation-stop signal or an alarm in response to the predicting signal.

A sign predicting abnormal increase of said tension may be represented by vertical motion of a dancer roller which applies a tension to the wire. In this case, abnormal increase of the tension is predicted from a fluctuation gap of the vertical motion, a fluctuation velocity of the vertical motion and/or acceleration of the vertical motion. The fluctuation of the tension of the wire may be combinatively used with vertical displacement of the dancer rollers for getting a predicting sign with a high reliability.

DETAILED DESCRIPTION OF THE PREFERRED EMBODIMENTS

Figure 1:
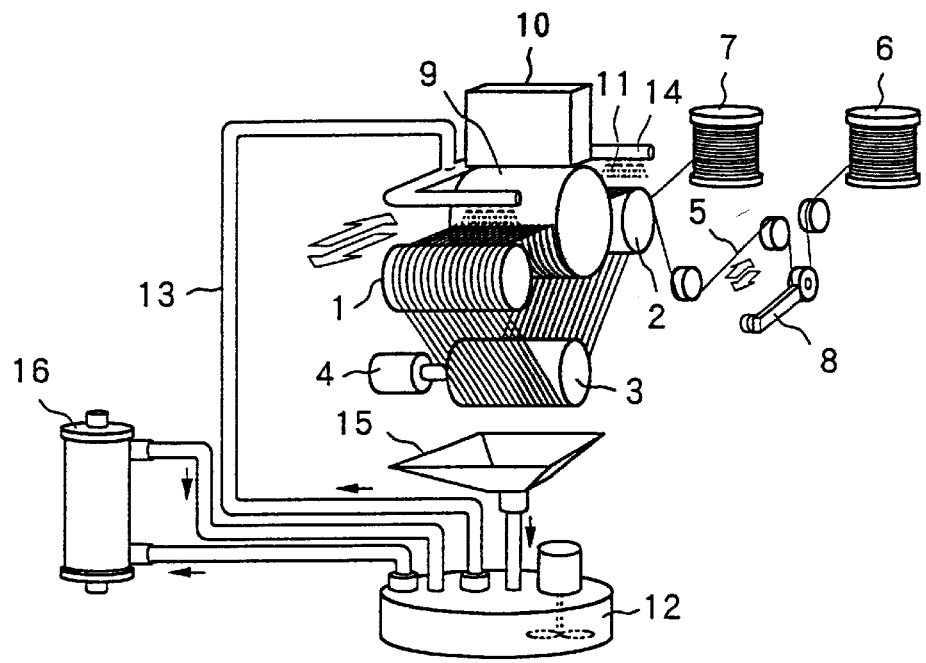
FIG. 1 is a schematic view illustrating a wire-sawing machine.
Figure 2:
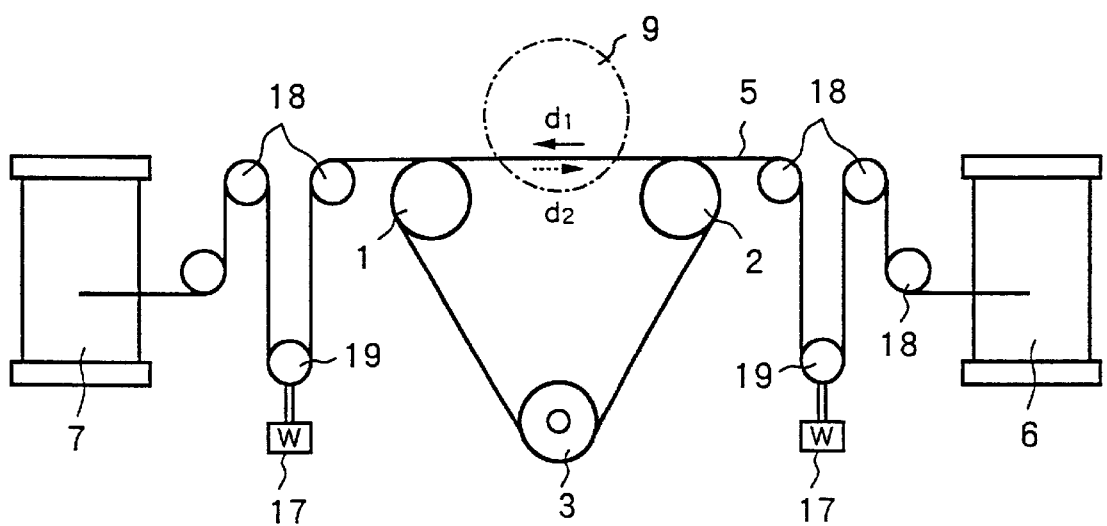
FIG. 2 is a view illustrating a travel path of a wire.

When an ingot is sliced to wafers by a wire-sawing machine, a tension applied to a wire 5 occasionally abnormally increases. Such abnormal increase of the tension would be caused by ununiform winding of the wire 5 on reels 6, 7, which may referred to as first and second reels, respectively, unbalance between unwinding and winding due to insufficient synchronization between rotating conditions of the reels 6 and a traverser at the unwinding side and rotating conditions of the reels 7 and a traverser at the winding side, entanglement of the wire 5 in the grooved rollers 1 to 3 or guide rollers having grooves deformed by abrasion, and so on.

The inventors have searched and examined the increase of a tension applied to the wire 5 in various points of view. As a result, the inventors have discovered appearance of a sign which predicts abnormal increase of the tension and confirmed that abnormal increase of the tension scarcely occurs without appearance of any predicting sign. Such the predicting sign is represented by violent vertical movement of the dancer roller 19, which is held at a predetermined height in a steady state, beyond a predetermined range or at a velocity or with acceleration above a predetermined limit, and/or fluctuation of a tension applied to the wire 5 and monitored by a wire tension gage beyond a predetermined range (i.e., fluctuating gap) or at a velocity (i.e., fluctuating velocity) or with acceleration (i.e., fluctuating acceleration) above a predetermined limit. We estimated that rupture of the wire 5 is prevented in bud by operation-stop of the wire-sawing machine or issue of an alarm requesting an operator to change operational conditions in correspondence with detection of such the predicting sign.

Figure 3:
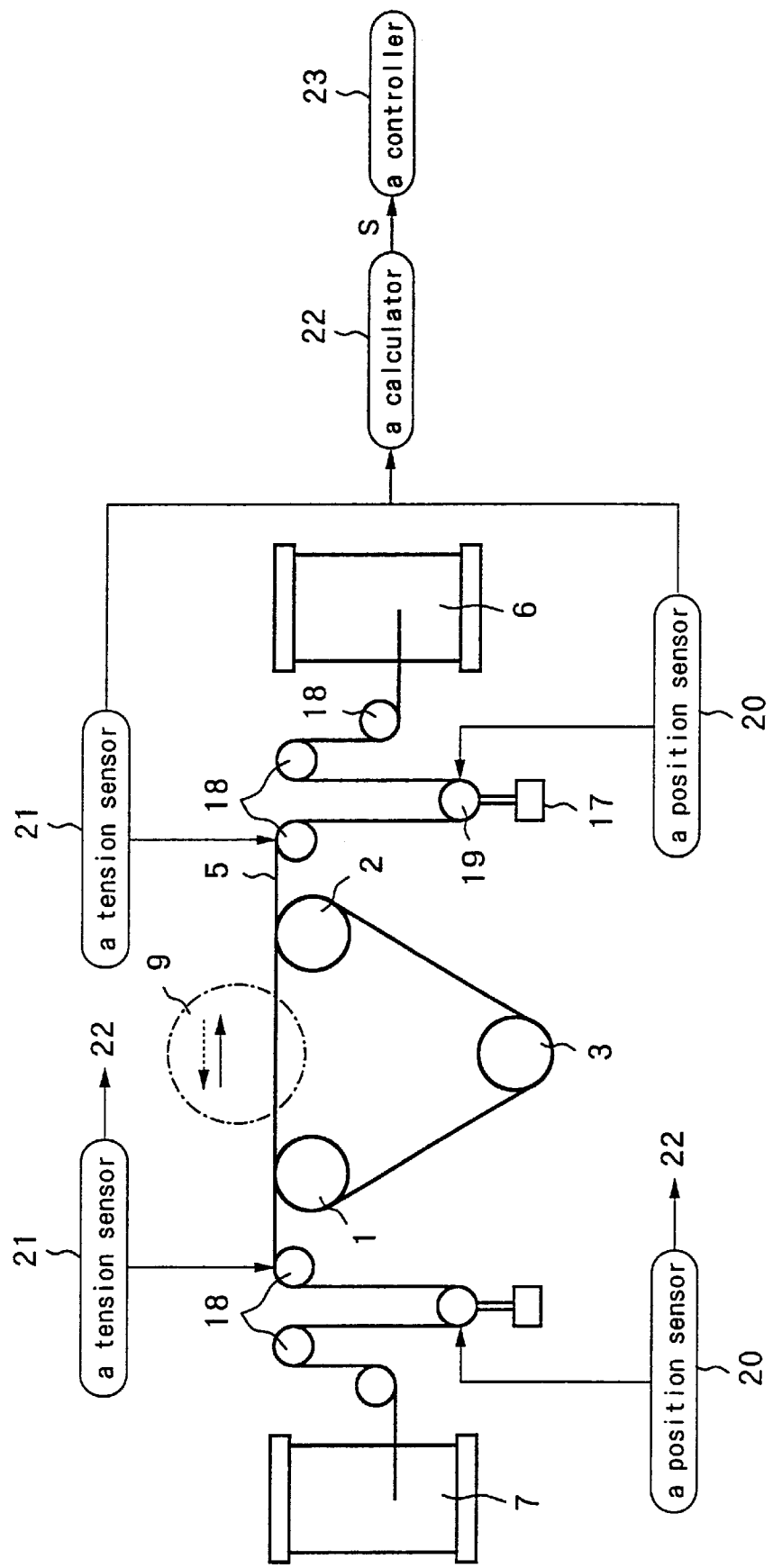
FIG. 3 is a view illustrating a travel path of a wire which installs therein a system for judging a sign predicting abnormal increase of a tension according to the present invention.

In order to detect such the predicting sign, position sensors 20, 20 for detecting displacement of the dancer rollers 19, 19 and tension sensors 21, 21 for detecting a tension applied to the wire 5 are provided at both sides of the wire saw, as shown in FIG. 3. The tension sensors 21, 21 are preferably located at positions between the grooved rollers 1, 2 and the deflector rollers 18, 18 for detecting a tension applied to the wire 5 sent out from the grooved rollers 1, 2.

The position sensors 20, 20 continuously detect positions of the dancer rollers 19, 19 which moves up and down in response to fluctuation of the tension. The detection results represent displacement of the dancer rollers 19, 19. Since data on the displacement is continuously obtained, a velocity or acceleration of the vertical movement of the dancer rollers 19, 19 is calculated from variation of the displacement. On the other hand, a value detected by the tension sensor 21 directly represents fluctuating situation of a tension applied to the wire 5.

Positional data of the dancer rollers 19 detected by the position sensors 20 together with tension data of the wire 5 detected by the tension sensors 21 are outputted to a calculating circuit 22. In the calculating circuit 22, positional data from the position sensors 20 and tension data from the tension sensors 21 are compared with preset values, respectively. On the basis of such comparison, outstanding ingot-slicing operation is regarded as in a normal state when vertical movement of the dancer rollers 19, a velocity of the vertical movement or acceleration of the vertical movement is held within a predetermined range or when fluctuation of the tension applied to the wire 5 is held within a predetermined range.

Since a sign predicting abnormal increase of the tension is varied in correspondence to material and a diameter of the wire 5 to be used, operational conditions of the wire-sawing machine and so on, it is preferable to previously determine such a signal accounting these factors. For instance, there occasionally occur vertical movement of the dancer rollers 19, 19 at a speed above 30 cm/second (0.98 ft/sec) or with acceleration above 50 cm/second$^2$(1.6 ft/sec$^2$) fluctuation of the tension applied to the wire 5 beyond a predetermined range of ±2 kgf/mm$^2$(2845 lb/in$^2$), and fluctuation of the tension at a velocity above 6 kgf/mm$^2$/second (8535 lb/in$^2$/sec), or with acceleration above 10 kgf/mm$^2$/second$^2$ in usual specifications. At least one of these values is preparatively inputted as a threshold to the calculating and judging circuit 22.

When positional data from the position sensors 20, 20 and/or tension data from the tension sensors 21, 21 exceed(s) the preset threshold(s), abnormal increase of the tension is predicted, and a signal s representing the predicted abnormal increase is outputted to a controller 23. The controller 23 outputs a command signal in response to the predicting signal s, in order to automatically stop operation of the wire-sawing machine or to issue an alarm. An operator immediately stops the operation of the wire-sawing machine in a safe state, or eliminates or corrected causes of abnormality, when he hears the alarm. He may also continue operation of the wire-sawing machine under careful observation until the ingot is completely sliced to wafers, and then perform action to eliminate or remedy causes of abnormality in order to prevent rupture of the wire 5 in future.

Rupture of the wire 5 is prevented in bud by detecting a sign predicting abnormal increase of the tension applied to the wire 5 and changing operational conditions in correspondence with the detected sign in this way. Consequently, the wire-sawing machine is efficiently driven for slicing an ingot to wafers with high productivity without troublesome works such as detaching a broken wire 5 and stretching a new wire 5.

In the wire-sawing machine according to the present invention as above-mentioned, fluctuation of a tension applied to a wire and/or vertical movement of dancer rollers are detected, and a sign predicting abnormal increase of the tension is judged from detection results. When such the predicting sign appears, slicing operation is stopped or the tension applied to the wire is reduced. Consequently, rupture of the wire is surely prevented in bud, and the wire-sawing machine can be driven with excellent efficiency.

What is claimed is:

1. A wire-sawing machine comprising;
    a plurality of grooved rollers having a plurality of grooves for travel paths of an ingot-slicing wire on peripheries thereof,
    a first wire reel for sending a new wire through deflector rollers to said grooved rollers,
    a second wire reel for winding a wire sent out from the grooved rollers through other deflector rollers,
    a tensioner for applying a predetermined tension to the travelling wire,
    at least a tension sensor for detecting a tension applied to said wire, provided at a position between the grooved rollers and said deflector rollers,
    calculating and judging circuits to which a detected value of said tension applied to said wire is inputted for judging a sign predicting abnormal increase of the tension from a fluctuating gap of said tension, a fluctuation velocity of the tension and/or an acceleration of said tension, and
    a controller to which a signal predicting abnormal increase of said tension is inputted from the calculating and judging circuits for outputting an operation-stop signal or an alarm in correspondence with the predicting signal.

2. A wire-sawing machine comprising;
    a plurality of grooved rollers having a plurality of grooves for travel paths of an ingot-slicing wire on peripheries thereof,
    a first wire reel for sending a new wire through deflector rollers to said grooved rollers, a second wire reel for winding a wire sent out from the grooved rollers through other deflector rollers, dancer rollers hanging balance weights for applying a predetermined tension to the travelling wire, provided at both sides of said grooved rollers, a position sensor for detecting a position of each of said dancer rollers moving up and down, calculating and judging circuits to which detected values of said position of said dancer rollers are inputted for judging a sign predicting abnormal increase of said tension from fluctuation of vertical movement of said dancer rollers, a velocity of said vertical movement, and a controller to which a signal predicting abnormal increase of said tension is inputted from the calculating and judging circuits for outputting an operation-stop signal or an alarm in correspondence with said predicting signal.

3. The wire machine as claimed in claim 2, wherein said sign predicting abnormal increase of said tension is further judged by acceleration of said vertical movement.

4. A wire-sawing machine comprising:

a plurality of grooved rollers having a plurality of grooves for travel paths if an ingot-slicing wire on peripheries thereof, a first wire reel for sending a new wire through deflector rollers to said grooved rollers, a second wire reel for winding a wire sent out from the grooved rollers through other deflector rollers, dancer rollers hanging balance weights for applying a predetermined tension to the travelling wire, with at least one of the dancer rollers located between the first wire reel and the plurality of grooved rollers, and with at least one of the dancer rollers located between the second wire reel and the plurality of Grooved rollers, a position sensor for detecting a position of each of said dancer rollers moving up and down, calculating and judging circuits to which detected values of said position of said dancer rollers are inputted for judging a sign predicting abnormal increase of said tension from fluctuation of vertical movement of said dancer rollers, and an acceleration of said vertical movement, and a controller to which a signal predicting abnormal increase of said tension is inputted from said calculating and judging circuits for outputting an operation-stop signal or an alarm in correspondence with said predicting signal.

* * * * *

UNITED STATES PATENT AND TRADEMARK OFFICE
CERTIFICATE OF CORRECTION

PATENT NO.     : 6,237,585 B1
DATED          : May 29, 2001
INVENTOR(S)    : Hiroshi Oishi et al.

It is certified that error appears in the above-identified patent and that said Letters Patent is hereby corrected as shown below:

<u>Title page,</u>
Item [73], Assignees, "Tokyo Seimitbu Co., Ltd." should read -- Tokyo Seimitsu Co., Ltd. --.

<u>Column 2,</u>
Line 51, after "wire;" insert -- and --.

<u>Column 3,</u>
Line 67, after "10 kgf/mm$^2$/second$^2$" insert -- (14225 lb/in$^2$/sec$^2$) --.

<u>Column 4, claim 1,</u>
Line 37, "comprising;" should read -- comprising: --.
Line 58, "from the calculating" should read -- from said calculating --.

<u>Column 4, claim 2,</u>
Line 62, "comprising;" should read -- comprising: --.

Signed and Sealed this

Second Day of April, 2002

Attest:

*Attesting Officer*

JAMES E. ROGAN
*Director of the United States Patent and Trademark Office*